| United States Patent [19] | [11] 3,932,323 |
| Perry | [45] Jan. 13, 1976 |

[54] SELECTIVE ADDITION OF ADDITIVES TO SOLID POLYMER

[75] Inventor: Robert J. Perry, Houston, Tex.

[73] Assignee: Phillips Petroleum Company, Bartlesville, Okla.

[22] Filed: May 10, 1973

[21] Appl. No.: 358,891

[52] U.S. Cl............................260/23 H; 260/45.9 NC; 260/94.9 GD; 264/211
[51] Int. Cl.$^2$.................................. C08L 23/06
[58] Field of Search.. 260/23 H, 45.9 NC, 94.9 GD, 260/42.57; 264/211

[56] References Cited
UNITED STATES PATENTS

| 3,163,492 | 12/1964 | Thomas | 260/23 H |
| 3,380,986 | 4/1968 | Vucht | 260/94.9 GD |
| 3,523,916 | 8/1970 | Needham et al. | 260/42.57 |
| 3,546,270 | 12/1970 | Kirchmayr | 260/45.9 NC |

*Primary Examiner*—Donald E. Czaja
*Assistant Examiner*—S. M. Person

[57] ABSTRACT

In blending additives with finely divided solid polymer, additives with melting points below the blending temperature are added first and additives with melting points above the blending temperature of the solid polymer are added subsequently.

9 Claims, 1 Drawing Figure

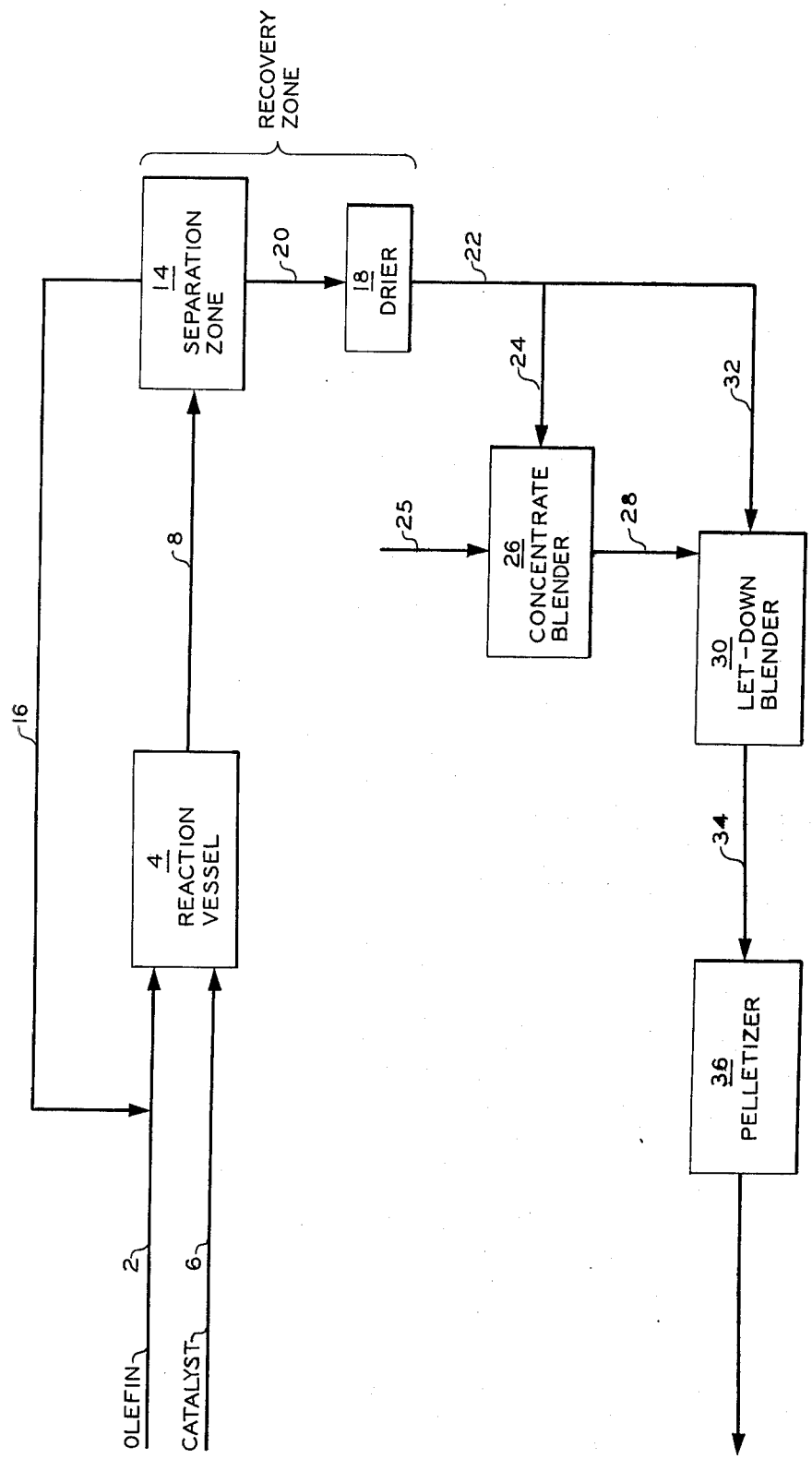

SELECTIVE ADDITION OF ADDITIVES TO SOLID POLYMER

BACKGROUND OF THE INVENTION

This invention relates to a method of dispersing additives normally solid at room temperature in finely divided solid polymer.

Conventional methods of dispersing additives such as stabilizers and pigments in solid polymers include melt blending the additives and the polymer on a roll mill, in a compounding extruder, or in an intensive mixer such as a Banbury mixer. Besides being a costly operation, the mechanical working necessary to effect adequate dispersion subjects the polymer to high shear at elevated temperatures where the polymer is molten and such working tends to degrade the polymer, particularly polymer which does not yet have a stabilizer well dispersed through it. Many efforts have been made to circumvent these shortcomings, for instance, by dry blending the additives with the polymer. However, when rather high concentrations of additives are blended with the solid polymer in making masterbatches for letting down into virgin polymer a sticky and gummy mixture often is formed. This sticky mixture accumulates on the blenders and other equipment. At times such mixture has restricted and completely plugged equipment thus shutting down a plant until the material causing the problem is removed. In addition such material often is difficult to disperse resulting in uneven distribution of the additives which is almost always unacceptable. In the case of antioxidants the portions of the polymer receiving less than the desired amount of antioxidant tend to degrade rapidly in use or even during fabrication. Conversely when antioxidant which has plated out onto the blender flakes off, polymer results with an excessive amount of antioxidant present. Depending on the antioxidant, this may result in discoloration, odor, or other deleterious effects.

The undesirable results from blending normally solid additives into polymer can be alleviated to some extent by first blending the polymer with some liquid dispersing agent which acts to stick the additive to the polymer. This is an inadequate solution since it necessitates an extra step and introduces an unnecessary and in many cases undesirable extra ingredient into the blend; nevertheless it is used on a commercial scale at the present time thus pointing up the need for a simple solution to the problem of dispersing normally solid additives in a polymer.

It is an object of this invention to disperse normally solid additives in solid polymer.

It is a further object of this invention to obtain excellent dispersion of additives in polymers without either the use of costly and possibly degrading melt blending or the introduction of unnecessary foreign materials such as dispersants.

It is still a further object of this invention to prepare a masterbatch of normally solid additives in polymer without either the use of costly and possibly degrading melt blending or the introduction of unnecessary foreign materials such as dispersants.

SUMMARY OF THE INVENTION

In accordance with this invention finely divided solid polymer is combined with two or more additives one of which has a melting point below the blending temperature and is added first, the other of which has a melting point above the blending temperature and is added subsequently. The use of the invention results in a well dispersed additive in solid polymer mixture even when high concentrations of additives are used without using the costly process of melt blending or using liquid dispersing agents.

DETAILED DESCRIPTION OF THE INVENTION

The drawing, forming a part hereof, is a simplified flow diagram of an olefin polymerization process which includes polymer recovery and the dispersion of additives in accordance with one embodiment of the instant invention.

Olefin monomer enters the reaction vessel 4 via line 2. Catalyst is fed into reaction vessel 4 via line 6. The resulting polymer carrying with it catalyst and unreacted monomer is removed from the reaction vessel via conduit 8 and passed to separation zone 14 where catalyst and other impurities are removed if desired and where the olefin monomer is flashed off and returned to the reaction vessel via line 16. The resulting polymer is then passed to dryer 18 via line 20, said separation zone and dryer constituting the recovery zone of the process. The hot polymer from the dryer is withdrawn in the form of fluff or powder via line 22. Line 22 is split, part of the polymer going via line 24 to concentrate or masterbatch blender 26 where additives are added to the hot polymer using for instance a ribbon blender. The additives may be added with the polymer through line 24 or through inlet 25. The resulting blend is then fed via line 28 through an appropriate metering device into let-down blender 30 where it is let down with virgin polymer from the dryer fed in by line 32; let-down blender 30 can be a continuous ribbon blender for instance. The resulting blend is fed via line 34 to pelletizer 36.

This invention is useful when at least two normally solid additives, with different melting or softening points as defined below, are to be incorporated into a finely divided solid polymer. The additives can be any materials which are solid at room temperature and where at least one but not all the additives melt below the blending temperature. Said blending temperature being below the melting point of the polymer. The blending temperature is low enough that the particles of polymer being blended do not become fluid and do not have any appreciable tendency to stick together. Normally this temperature is substantially below both the melting point and softening point of the polymer. Quite often the blending temperature is the temperature existing in the polymer particles as received from the preceding step in the process. That is, usually it is not necessary either to add or remove appreciable heat from the polymer merely for the purpose of blending. However, of course the practice of the present invention is not dependent upon whether heat is added or removed to reach the blending temperature.

As used herein the term "blending temperature" is used to mean the lowest temperature existing in the blending step. Whether a batch or continuous blending operation is used, usually the lowest temperature in the blender is below the temperature of the entering polymer particles due to heat losses in blending and the melting of the lower melting additives.

By lower melting additives is meant those additives which are sufficiently fluid to be thoroughly blended with the polymer particles at the blending temperature. On the other hand higher melting additives are those additives which are not substantially softened at the temperatures encountered in the blending step. It is preferred that a definite difference exists between the melting temperatures (or softening temperatures) of the lower melting additives and the higher melting additives. For example a difference of about 5°F normally exists. A difference of about 10°F is preferred to allow for blending temperature variation. It may be necessary with a given combination of additives to select a blending temperature at a point where a substantial gap in the softening or melting temperatures of the additives exists.

A solid or liquid as used herein means that a particular material is normally a solid or liquid at ambient, atmospheric or room temperature, that is, approximately 25°C. Softening points are mentioned because some additives do not change from a solid to a liquid at a specific temperature but merely soften over a temperature range and may be amorphous in character. Additives with melting or softening points below the blending temperature are selected to be added first. In the practice of the present invention, all additives having melting points below the blending temperature, whether one or more than one, are completely blended with the solid polymer prior to contact with the additives having melting points above the blending temperature. The blending can be accomplished in a single blender by adding first the lower melting additives and subsequently the higher melting additives, or the blending can be accomplished in consecutive blenders. It is usually not necessary to have separate blenders for each additive but of course this can be done if desirable.

This invention is applicable for use with any suitable thermoplastic material in a solid particulate form. The invention is particularly applicable for use with homopolymers and copolymers of mono 1-olefins having 2–8 carbon atoms such as ethylene, propylene, 1-butene, 1-pentene, 1-hexene, 4-methyl-1-pentene, and 1-octene. Such polymers include polyethylene, polypropylene, ethylene-propylene copolymers, ethylene-butene-1 copolymers, ethylene-pentene-1 copolymers, propylene-butene-1 copolymers and ethylene-hexene-1 copolymers.

The term finely divided solid polymer as used herein means solid polymer which exists as a powder, fluff, grind or some other particulate form. Many polymerization processes produce a product which in its initial state from the polymerization and subsequent recovery zones exists in a finely divided form, such as a porous fluffy form recovered from the polymerization medium in some processes, said fluffy polymer having a bulk density of from about 8 to about 22 pounds per cubic foot. Ground polymer is suitable. In using powdered or ground polymer the fineness of the grind can vary widely, for instance, from about 10 to about 450 mesh but generally it will be from 16 to 350 mesh. However, it is possible to use particles with a nominal diameter of approximately ⅛ inch or larger. In any case the polymer should be composed of sufficiently divided particles to permit rapid blending with the additives. The fine polypropylene powder or fluff produced by some commercial techniques is in an ideal physical state for use in the practice of the instant invention.

The blending of the finely divided solid polymer and the normally solid additives as well as liquid additives can be done in any suitable dry blending apparatus which provides sufficient agitation to mix the polymer and additives. Particularly suitable is the ribbon blender, either continuous or batch type; also suitable are twin cone blenders, drum tumblers and zig-zag blenders. The additives are dispersed throughout the polymer and to some extent absorbed into the polymer yet the polymer undergoes no shear and no appreciable degradation since the rate of degradation is very low at temperatures below the melting point of the polymer. To further insure against degradation, the polymer can be kept under an inert atmosphere such as nitrogen during preparation of the concentrate and subsequent blending. The temperature at which the polymer is blended with the additives must be lower than the melting point of the polymer, but it must be high enough to melt or soften one or more but not all of the additives. Frequently the blending temperature of the polymer may be within the range of from 125° to 300°F. While the polymer can be heated to the proper temperature, in the preferred embodiment, the hot polymer fluff or powder goes directly from the recovery zone of the reactor into the weigh tank and the blender. For example, the temperature of polypropylene fluff directly from the recovery zone often is in the range of 210°–240°F and blending the fluff with additives in accordance with the present invention and within this temperature range has produced excellent results. This is of particular advantage when adding antioxidants since the polymer has little opportunity for exposure to oxygen to begin the degradation process; rather it is stabilized within minutes after it has been produced. By the time the higher melting point additives are added, the hot polymer will have cooled off somewhat because the residual heat in said polymer effects the melting of the additives which were added first and which have melting points below the blending temperature. For example with hot polypropylene fluff at a temperature of 210° to 240°F coming from the recovery zone of the reactor and with the low melting additives added to the fluff at that temperature, the temperature of the resultant mixture prior to adding the higher melting additives can fall to approximately 190°F. This temperature, i.e., 190°F, is the blending temperature to be used in determining which of the additives fall into the high and low melting groups. Of course, this reduction in temperature occurs if no outside source of heat is supplied to maintain the mixture at a constant temperature and such addition of heat is usually not required. But heat can be added or removed if desired by application of the proper means to the blender.

While it is not known exactly what happens during the blending it is believed that when the low melting point additives are added first the solid polymer absorbs them and then the high melting point additives cover the exposed surface of the solid polymer reducing tackiness, etc. Observation indicates when the low melting point additives are added the solid polymer becomes tacky but when the high melting point additives are then added it immediately dries up. This selective addition process gives the unexpected result of allowing considerably higher concentrations of additives in the polymer mixture before a sticky condition appears than can be achieved by blending all the additives at one time with the virgin polymer.

It should be pointed out that where two or more additives are selected to be added to the polymer together based on the melting point of the additives, if interaction between these additives occurs, the group of additives may be further broken down to eliminate such interaction. Also while this invention is directed toward the use of solid additives, that is solids at ambient temperature, if one or more of the desired additives is a liquid at ambient temperature, but because of its nature or because of the limitations on the concentration to be used it does not act as a dispersing agent so as to make possible satisfactory blends using solid polymer, it can be incorporated with the low melting additives. Non-limiting examples of the types of additives which are suitable for incorporation utilizing the process of this invention include normally solid heat stabilizers and antioxidants such as normally solid alkylated phenols, thio-bis-alkylated phenols, aromatic amines, dialkylthiodipropionate, and the like; ultraviolet light stabilizers such as phenyl salycilate, substituted benzophenones, nickel complexes and the like; other additives such as pigments, antistatic agents, flame retardants and the like which are normally solid and others like glass which do not melt but impart special qualities to the polymer.

The process of this invention is equally applicable to the direct formation of the desired blend or to the formation of a masterbatch or concentrate blend which is later let down in virgin polymer to give the desired final concentration. The present invention finds particular utility in masterbatch preparation where relatively high concentrations of additives are required. When a masterbatch is being prepared, the finely divided solid polymer can have from about 0.1 to about 50 weight percent additive blended with it based on the weight of the total mixture. Frequently masterbatch recipes call for additive concentrations to be in the range of from about 5 to 30 weight percent of masterbatch, but the limiting factor on maximum concentration of additives is stickiness and the resultant difficulty in handling as additive concentration increases. Such a concentrate is then let down with additional finely divided virgin polymer in an amount necessary to give the desired final concentration; generally the ratio of virgin polymer to concentrate can be in the broad range of about 2 to about 100 parts by weight of virgin polymer per part of concentrate, but usually the ratio is from 3 to 25.

The blending time can vary widely depending on the materials involved. One minute to about 5 hours blending time may be required, but of course the minimum amount of time for adequate dispersion of additives is desired and this usually takes from about 5 to 30 minutes. When the polymer and additives have been blended and let down with the proper proportion of virgin polymer, the mixture can then be pelletized in a pelletizing extruder.

Table I illustrates a list of additives giving their chemical name and melting or softening points which are commonly incorporated into polypropylene.

TABLE I

| Chemical Name | Melting Point (MP) or Softening Point (SP) |
| --- | --- |
| 3,3'-dilauryl thiodipropionate | 104°F (SP) |
| 2-hydroxy-4-n-octoxybenzophenone | 116°F (SP) |
| 3,3'-distearyl thiodipropionate | 147°F (MP) |
| 2,6-di-tert-butyl-para-cresol | 156.2°F (MP) |
| erucamide | 161.6 – 186.8°F (MP) |
| bis [2-(2-hydroxy-5-tertoctylthiophenol)-4-tert octyl phenolate] nickel (II) | Amorphous starts at 194°F (MP) |
| tetrakis(methylene 3-(3',5'-di-t-butyl-4'-hydroxyphenyl)(propionate) methane | 248–257°F (MP) |
| 2,4 bis(4-hydroxy-3,5 ditertiary butyl phenoxy)-6-(n-octyl-thio) 1,3,5 triazine | 275°F (MP) |
| calcium stearate Ca[$C_{18}H_{35}O_2$]$_2$ | 302°F (SP) |

EXAMPLE I

The polypropylene used in this example was a solid having a particle size as evidenced by the weight percent retained on U.S. standard sieve screens with the indicated number of meshes per lineal inch as follows: 20 mesh, 5.9 percent; 60 mesh, 35.8 percent; 100 mesh 16.6 percent; 200 mesh, 18.6 percent; 325 mesh, 15.0 percent; and greater than 325 mesh, 8.1 percent. The polypropylene used was taken directly from the recovery zone of the reactor and was used to prepare a masterbatch for letting down with virgin polypropylene. Table II illustrates the pounds of additive added to the hot polypropylene per 100 pounds of masterbatch.

The lower melting additives of Group I were selected because their melting or softening points were below the blending temperature of approximately 190°F. The higher melting additives all have melting or softening points above 190°F.

TABLE II

| | Additive | No./100 No. Masterbatch Run 1 | Run 2 |
| --- | --- | --- | --- |
| Group I | 3,3'-dilauryl thiodipropionate | 3.6 | 6.1 |
| | 2-hydroxy-4-n-octoxybenzophenone | 2.6 | 4.4 |
| | bis [2(hydroxy-5-tertoctylthiophenol)-4-tertoctyl phenolate] nickel (II) | 8.1 | 13.5 |
| Group II | 2,4 bis(4-hydroxy-3,5 ditertiary butyl phenoxy) -6-(n-octyl-thio) 1,3,5 triazine | 0.4 | 0.6 |
| | calcium stearate Ca[$C_{18}H_{35}O_2$]$_2$ | 0.3 | 0.4 |
| | Total Additives | 15.0 | 25.0 |
| | Polymer | | |
| | Polypropylene | 85.0 | 75.0 |
| | Total Masterbatch | 100.0 | 100.0 |

In Run 1 all of the additives (Group I and Group II) were blended with the polypropylene in a ribbon blender at one time and mixed approximately 10–15 minutes. In this run in which the total additives equaled 15 weight percent of the total masterbatch the feeder from the concentrate blender to the let-down blender became overloaded and clogged due to the sticky condition of the masterbatch.

In Run 2, a run of the present invention, the Group I additives were added and blended with the hot polypropylene first. A ribbon blender was used as in Run 1. The first group of additives were mixed about 5 minutes before Group II additives were added. After the Group II additives were added the mixture was blended an additional 10–15 minutes.

In Run 2 the total additives equaled 25 weight percent of the masterbatch. Even with the additive concentration at 25 percent, the masterbatch did not appear to have the maximum amount of additives possible before the masterbatch became too sticky to be carried by the process equipment.

What is claimed is:

1. A method of additive addition to finely divided solid polymer wherein said polymer is a polyolefin having a bulk density of from about 8 to 22 pounds per cubic foot and wherein at least one additive is softened or melted at the blending temperature and at least one additive remains solid at the blending temperature and said blending temperature is below the melting point of said solid polymer comprising:
   first, adding the additives which melt or soften below said blending temperature and blending the resultant mixture; and
   subsequently adding the additives which are solid at the blending temperature and blending the resultant mixture.

2. The method of claim 1 wherein said polymer is a polyolefin and the size of substantially all of the particles of the polymer is within the range of ⅛-inch nominal diameter to 450 mesh.

3. The method of claim 1 wherein the additive concentration is in the range of 0.1 to 50 weight percent based on the weight of the mixture, and said mixture is let down with virgin polymer in the range of 2 to 100 parts virgin polymer per part of mixture.

4. The method of claim 2 wherein said polyolefin is polypropylene, said polypropylene is taken directly from a recovery zone of a reactor; said polypropylene is blended with additives in the range of from 5 to 30 weight percent additives based on total weight of mixture; resultant mixture is let down with virgin polypropylene in the range of from 3 to 25 parts of virgin polypropylene per part of mixture.

5. The method of claim 2 wherein said polyolefin is polyethylene.

6. The method of claim 2 wherein said polyolefin is at a blending temperature in the range of 125° to 300°F.

7. The method of claim 4 wherein said polypropylene is at a blending temperature in the range of 190° to 240°F.

8. The method of claim 1 wherein said polyolefin is polypropylene; the following low melting additives are added and blended first:
   3,3'dilauryl thiodipropionate
   2-hydroxy-4-n-octoxybenzophenone and,
   the following high melting additives are added and blended subsequently:
   bis[2(hydroxy-5-tertoctylthiophenol)-4-tertoctyl phenolate] nickel (II)
   2,4 bis(4-hydroxy-3,5 ditertiary butyl-6-(n-octylthio) 1,3,5 triazine
   calcium stearate $Ca[C_{18}H_{35}O_2]_2$ 9. The method of claim 8 wherein said polypropylene is polypropylene fluff.

* * * * *